United States Patent

Mertler

[11] 3,913,048
[45] Oct. 14, 1975

[54] THERMOSTATIC SWITCH

[76] Inventor: Charles S. Mertler, 1012 Briarwood Road, Mansfield, Ohio 44907

[22] Filed: Feb. 25, 1974

[21] Appl. No.: 445,778

[52] U.S. Cl. .................. 337/67; 337/68; 337/85; 337/360; 337/361; 337/374
[51] Int. Cl.² .................................. H01H 71/16
[58] Field of Search .......... 337/67, 68, 82, 85, 337, 337/347, 360, 361, 362, 374, 375, 355

[56] References Cited
UNITED STATES PATENTS

| | | | |
|---|---|---|---|
| 3,201,548 | 8/1965 | Mertler | 337/355 |
| 3,239,633 | 3/1966 | Bletz | 337/347 |
| 3,451,029 | 6/1969 | Levinn et al. | 337/349 |
| 3,452,312 | 6/1969 | Bauer | 337/349 |

Primary Examiner—E. T. Hix
Assistant Examiner—Fred E. Bell
Attorney, Agent, or Firm—Woodling, Krost, Granger & Rust

[57] ABSTRACT

A thermostatic switch is disclosed with a resilient and a rigid contact blade and with adjustment of the operating temperature of the thermostatic switch effected by adjustment of the position of a temperature responsive means such as a bimetallic member. This construction permits a thermostatic switch which has much more predictable operating characteristics and much more uniform operating characteristics, one switch to the next in a production run and a switch which has elimination of or minimization of an overshoot in temperature as the controlled electrical appliance comes up to operating temperature. Also, this thermostatic switch may have incorporated therein an attitude responsive means such as a pendulum to open the same switch contacts should the switch be tilted, as in an application of a tilt-responsive switch usable with an electric heater for example. The foregoing abstract is merely a resume of one general application, is not a complete discussion of all principles of operation or applications, and is not to be construed as a limitation on the scope of the claimed subject matter.

20 Claims, 12 Drawing Figures

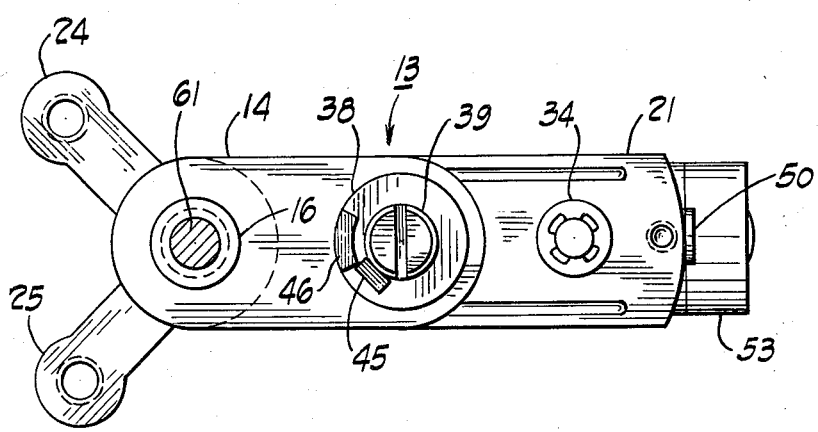
Fig. 1
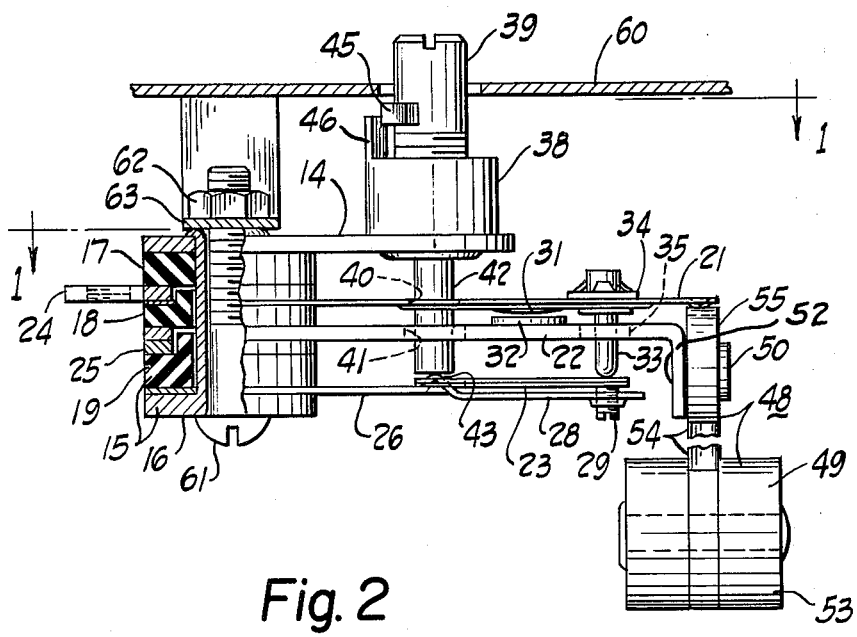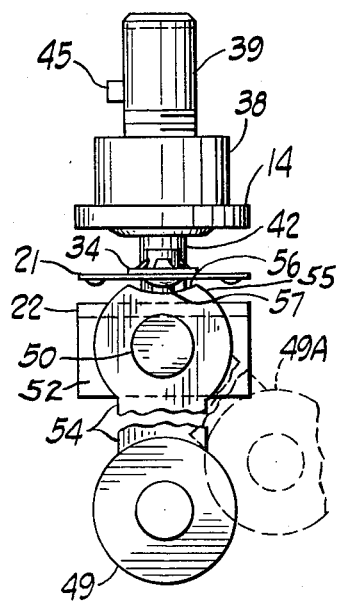
Fig. 2
Fig. 3
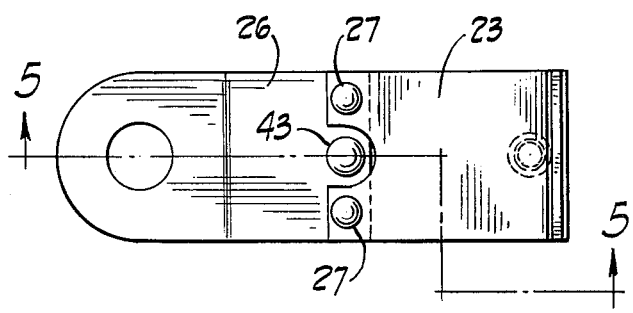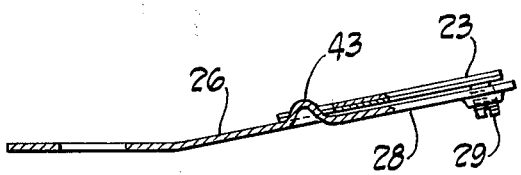
Fig. 4
Fig. 5

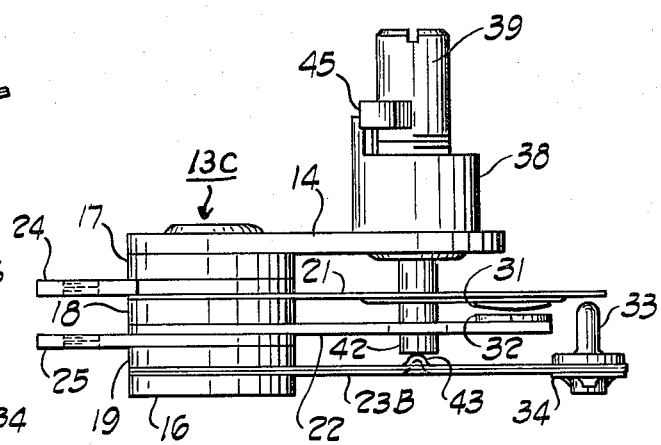
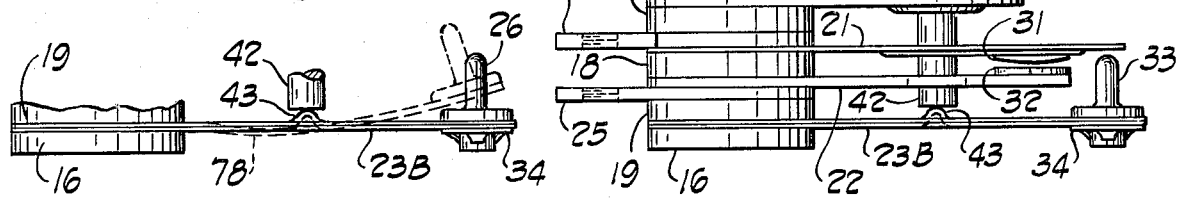
Fig. 9
Fig. 11  Fig. 10
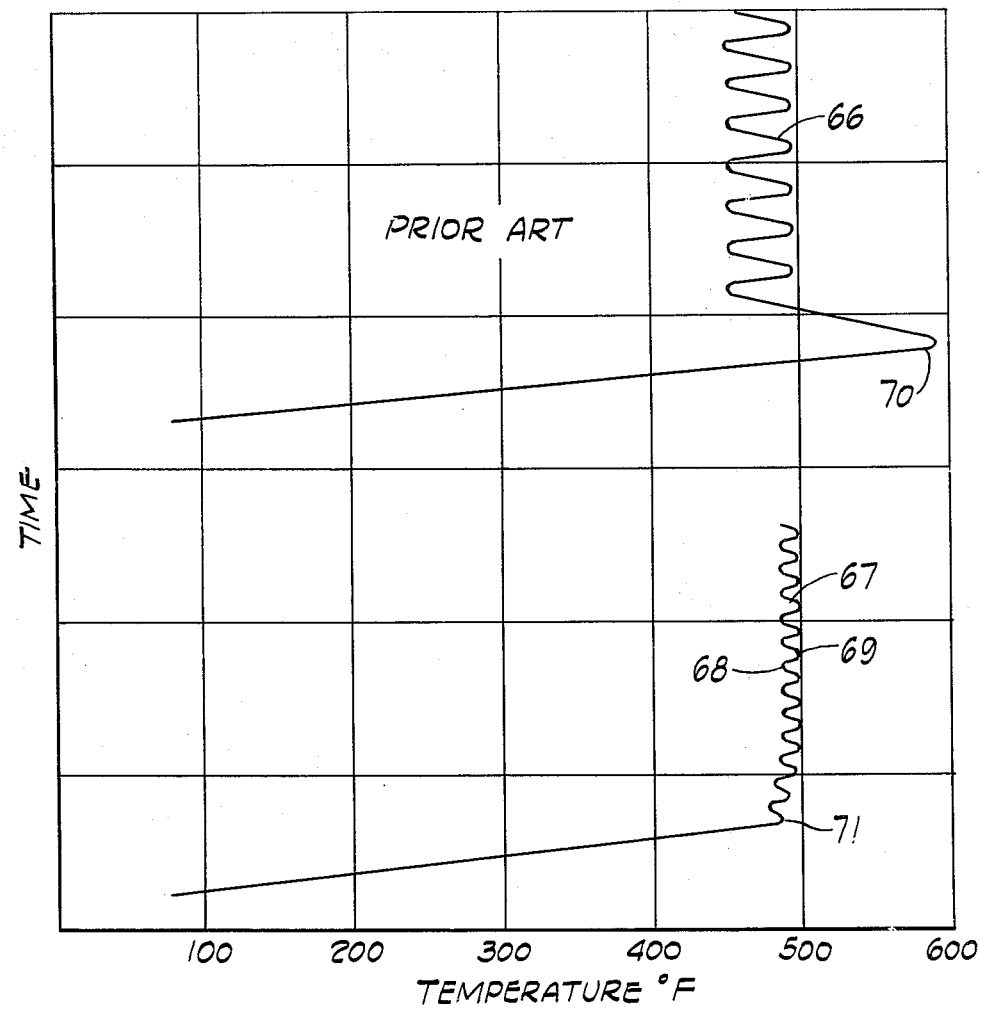
Fig. 12

3,913,048

THERMOSTATIC SWITCH

BACKGROUND OF THE INVENTION

A standard commercial construction of a thermostatic switch is similar to that shown in my prior U.S. Pat. 3,201,548 issued Aug. 17, 1965. Such construction shows a stack-type thermostatic switch with first and second resilient contact blades each carrying a contact. Such typical commercial construction is one wherein the temperature responsive means such as a bimetallic blade acts to move the first resilient contact blade and an adjusting screw acts to move the second resilient contact blade. THe second resilient contact blade has an initial bias, as clamped in the stack, which is a deflection toward the adjustment screw. Thus, as the adjustment screw is retracted, the resilient contact blade must follow along, remaining in contact therewith, and must also push and deflect the first resilient contact blade. This means that the second resilient contact blade must have a fairly strong force of an initial bias and it also means that the attitude of the two blades changes for the different adjustment positions of the adjusting screw. Such construction therefore has the disadvantage that the bimetal has a greater loading force to open the contacts at high temperature settings than at low temperature settings of the adjusting screw. This is because of the greater deflectional force on the first contact blade at high temperature settings. Also, such construction means that the contact pressure between the contacts at the operating point varies in accordance with the adjusted operating temperature. This variable bimetal loading and the variable contact pressure means that there is a variable temperature differential between open and closed conditions of the contacts for different temperature settings.

Such prior patent also disclosed a tilt-responsive switch which might be used with an electrical appliance such as an electric room heater. This tilt-responsive switch was dependent upon the position of a swinging pendulum mounted on the second resilient contact blade. Because the different temperature settings meant different attitudes of the contact blades relative to the base, this meant that there was a different contact gap in the tilted position for different temperature settings. Also, the different attitudes of the contact blades with different temperature settings meant that the pendulum did not remain perpendicular to the first contact blade throughout the temperature-setting range. Still further at the high temperature settings with the first contact blade stressed to a greater extent, this meant that the pendulum cam had to work against a greater force at the higher temperature settings, necessitating a heavy pendulum to make certain that the pendulum would be able to open the contacts at all temperature settings. Similarly the bimetallic member had to be made large to develop a large force so as to be able to open the contacts at all temperature settings. Further, such typical prior art constructions of two resilient contact blades did not lend itself easily to manufacture of a positive-off thermostat. Such construction is often required to make certain that the contacts stay out of engagement when the adjusting screw is set at an off condition regardless of any ambient temperature.

SUMMARY OF THE INVENTION

The invention may be incorporated in a thermostatic switch comprising, in combination, a rigid base, a stack mounted on said base, a resilient first contact blade mounted in said stack, a substantially rigid second contact blade mounted in said stack, first and second contacts on said first and second blades, respectively, and positioned for mutual cooperation, temperature responsive means mounted in said stack and acting on said first contact blade to actuate said first contact blade with temperature changes, and adjusting means acting between said base and said temperature responsive means for adjustment of the operating temperature of said contacts.

An object of the invention is to provide a thermostatic switch which obviates the above mentioned deficiencies of the prior art switch constructions.

Another object of the invention is providing a thermostatic switch which may have incorporated therein a tilt-responsive pendulum and also may easily incorporate a positive-off feature.

Other objects and a fuller understanding of the invention may be had by referring to the following description and claims, taken in conjunction with the accompanying drawing.

BRIEF DESCRIPTION OF THE DRAWING

FIG. 1 is a plan view of a thermostatic switch incorporating the invention and also having an attitude-responsive pendulum;

FIG. 2 is a side elevational view of the switch of FIG. 1;

FIG. 3 is an end elevational view of the switch of FIG. 2;

FIG. 4 is a plan view of the temperature responsive means before assembly into the thermostatic switch;

FIG. 5 is a sectional view on Line 5—5 of FIG. 4;

FIG. 9 is a side elevational view of the bimetallic blade of the thermostatic switch of FIG. 8 prior to assembly;

FIG. 10 is a side elevational view of a thermostatic switch according to the invention and without an attitude-responsive pendulum;

FIG. 11 is a partial view similar to FIG. 10 showing, in dotted lines, the position of the bimetallic blade in a heated condition; and FIG. 12 is a graph of time versus temperature.

DESCRIPTION OF THE PREFERRED EMBODIMENTS

Figure 6:
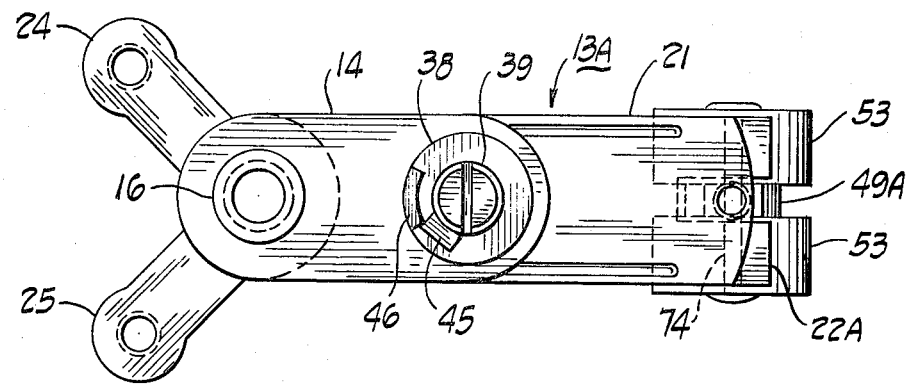
FIGS. 6 and 7 are plan and elevational views of a modification.

FIGS. 1-3 show a preferred embodiment of the invention of a thermostatic switch 13 which has a base 14. A stack 15 is fixedly secured on the base 14 as by a rivet 16. The stack 15 includes insulating washers 17, 18, and 19 which mutually insulate a first resilient and a second rigid contact blade 21 and 22, respectively, and insulate them from the base 14. The stack 15 also carries temperature responsive means shown as a bimetallic blade 23. The term bimetallic also includes the term trimetallic, so long as the blade 23 moves in response to temperature changes. Terminals 24 and 25 are mounted in the stack 15 in electrical and physical contact with the first and second blades 21 and 22, respectively. The temperature responsive means 23 is better shown in FIGS. 4 and 5 prior to assembly in the stack 15 and the bimetallic blade 23 is a part of a composite structure including a spring blade 26 with one end thereof actually mounted in the stack 15 and the bimetallic blades 23 secured by spot welding or rivets 27 to an intermediate portion of the spring blade 26. The outboard end 28 of the blade 26 provides a positive-off feature and contains a positive-off screw 29 in this preferred embodiment.

First and second contacts 31 and 32 are fixedly mounted on the first and second contact blades 21 and 22, respectively, for mutual cooperation. The base 14 and the blades 21 and 22 and 23 are mutually parallel in the stack 15. The outboard end of the bimetallic blade 23 cooperates with the outboard end of the first contact blade 21. In this preferred embodiment of FIGS. 1–5 this cooperation is effected by an insulator pin 33, such as a ceramic pin fixedly held by an internal tooth spring washer 34 on the first contact blade 21. This insulator pin 33 extends through an aperture 35 in the second contact blade 22 in order to effect cooperation between the contact blade 21 and bimetallic blade 23.

Adjusting means is provided to adjust the operating temperature of actuation of the contacts 31 and 32. This adjusting means is shown as a nut 38 fixed on base 14 and an adjusting screw 39. The lower end of the adjusting screw 39 has an insulator extension 42 which passes through apertures 40 and 41 in the contact blades 21 and 22, respectively. The lower end of the insulator extension 42 engages an embossed abutment 43 on the spring blade 26. This provides generally a point contact for low-friction adjustment of the position of this spring blade 26 and hence the position of the outer end of the bimetallic blade 23. Through the medium of the insulator pin 33 this adjusts the position at which the contacts 31 and 32 are actuated to establish different operating temperature settings.

The adjusting screw 39 carries a lug 45 which may engage either side of an upstanding lug 46 on the nut 38 to provide two arcuate limits to the adjustment movement of the adjusting screw 39.

An attitude responsive means 48 is provided in the thermostatic switch 13. In the FIGS. 1–5 this attitude responsive means includes a tilt-responsive pendulum 49 which is mounted relative to the second contact blade 22. In FIGS. 2 and 3 it is shown as being swingably or pivotally mounted on the pivot 50 to an L-shaped extension 52 of the second contact blade 22. The pendulum 49 is formed of a weight 53 and an insulator leg 54, the upper end of which is pivoted at the pivot 50, and is shaped as a cam 55 having a cam null or notch 56. The cam notch may be at any desired peripheral position on cam 55, according to whether a normally open or normally closed switch is desired, and according to the attitude of mounting on the appliance. In the position shown in FIGS. 2 and 3 with the thermostatic switch 13 in its normal or upright position this cam notch 56 cooperates with an embossed dimple or abutment 57 on the first contact blade 21. This dimple 57 acts as a cam follower.

The thermostatic switch 13 may be mounted on an electrical appliance 60 for control thereof, such as shown in U.S. Pat. No. 3,201,548. Such electrical appliance might be a room heater which has a motor-driven fan blowing air across an electrical heater element and a thermostatic switch controls electrical energy to the motor and heater in parallel, or at least to the heater. Small room heaters are relatively small and light, typically made of sheet metal. They may not have particularly stable bases and they are subject to being tipped over. Upon being tipped over the pendulum 49 could move to the dotted line position 49A shown in FIG. 3, and hence the cam 55 would cooperate with the cam follower 57 to positively separate the contacts 31 and 32 regardless of any adjustment position of the adjusting screw 39. This would denergize the motor and heater or at least the electrical heater so that danger of fire is eliminated. The thermostatic switch 13 may be mounted in any desired manner to the electrical appliance 60. For example, by the nut 38 as in U.S. Pat. No. 3,201,548, by the base 14, or as shown in FIG. 2 by a mounting nut 62 and bolt 61, passed through the hollow rivet 16 to secure the switch 13 to a bracket 63 on the appliance 60.

OPERATION

The thermostatic switch 13 will be connected at the terminals 24 and 25 to control an electrical appliance 60. The construction of the thermostatic switch 13 has many advantages. One of these is a construction which readily permits a positive-off feature. Safety regulations often require such a positive-off feature which meanns that the contacts 31 and 32 are separated when the adjusting screw 39 is in the off position shown in FIG. 2, and this regardless of any ambient temperature for the thermostatic switch 13. To achieve this positive-off position the adjusting screw 39 is adjusted to its clockwise limit position with the lugs 45 and 46 in engagement as shown in FIGS. 1 and 2. In this position the adjusting screw 39 is moved upwardly to its maximum extent thus essentially straightening out the spring blade 26 from its free position shown in FIG. 5 to the position shown in FIG. 2. During manufacture of the switch 13 the positive-off screw 29 is adjusted to give a slight spacing to the contacts 31 and 32, such as shown in FIG. 2. The positive-off screw 29 may not be needed and instead the outboard end 28 of the spring blade 26 may be bent up to engage the outer end of the bimetallic blade 23 to achieve this positive-off feature. The high expansion side of the bimetallic blade 23 is on the lower side as viewed in FIG. 2 so that the blade 23 warps upwardly upon increase of temperature.

The high expansion side could be on top, for contact close on temperature rise. When the adjusting screw 39 is rotated counter-clockwise away from the lug 46, the screw will move from the off region to a variable operating temperature region. The threads on the screw 39 could be right-hand threads, but are shown as left-hand threads so that the spring blade 26 is moved downwardly, as viewed in FIG. 2. This permits the contacts 31 and 32 to close and to pass electric current to the electrical heater appliance 60. Assuming it is a motor driven fan blowing warm air from the heater across the bimetallic blade 23, the blade will warp upwardly and open the contacts 31 and 32 when the operating temperature is reached. The thermostatic switch 13 will thus cycle on and off to maintain the selected operating temperature. Should the heater be tipped over, the attitude-responsive means 48 namely, the pendulum 49, will act through the cam 55 and cam follower 57 to positively move the contact 31 out of engagement with the contact 32 for any and all adjustment positions of the screw 39.

The bimetallic blade 23 is shorter than the first contact blade 21, and actually is shorter than the distance from the stack 15 to the center of the first contact 31.

In the present invention the second contact blade is relatively rigid and accordingly the position of the second contact 32 does not change materially. For all adjustment positions of the adjustment screw 39 the force required to open the contacts is substantially constant. This means that the bimetallic blade 23 may be chosen and proportioned in size and shape so that only a relatively small force is required, compared to the size of the contacts 31 and 32 and their amperage current carrying capability. Accordingly, the bimetallic blade 23 is only about 50 percent as long as the prior art construction and is about 50 percent thinner, because in general the deflection is inversely proportional to the thickness of the blade. Therefore, a short bimetallic blade permits the blade to be made thinner. This makes a more thermally responsive bimetallic blade.

Figure 7:
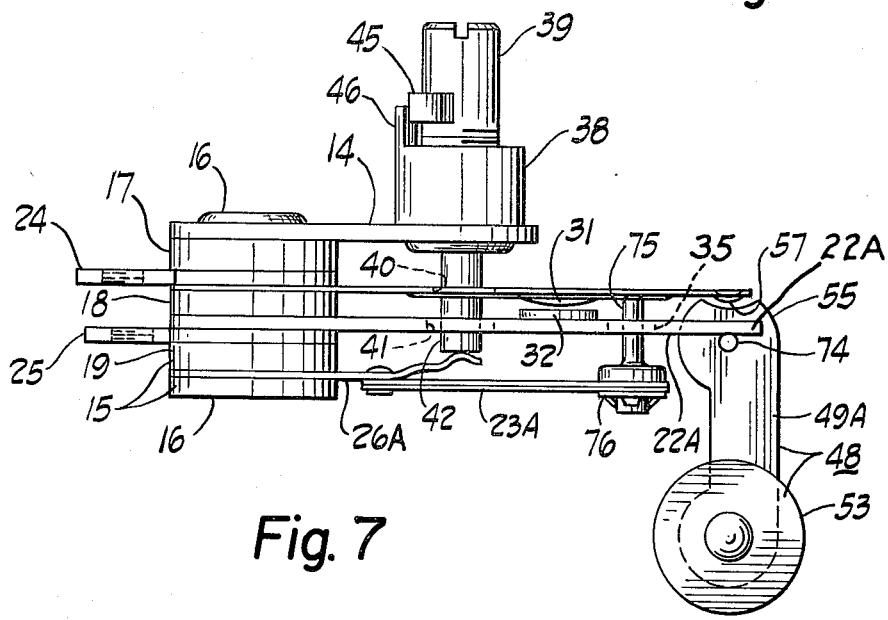

FIGS. 6 and 7 show a second embodiment of a thermostatic switch 13A wherein many parts are the same as in the FIGS. 1–3 and have been given the same reference numerals. The pendulum 49A is mounted to swing in the plane of the paper of FIG. 7 rather than in a plane perpendicular to the plane of the paper, as in the embodiment of FIG. 2. The second contact blade 22A is straight rather than having an L-shaped end and secured thereto as by welding is a pivot axle 74 for pivoting the pendulum 49A. The choice of a thermostatic switch as shown in FIGS. 1–3 or FIGS. 6 and 7 is dependent upon the mounting position of the thermostat relative to the electrical appliance 60 and the plane of possible tipping over of the appliance 60. FIGS. 6 and 7 also show a modified form of temperature responsive means of a spring blade 26A and a bimetallic blade 23A. The spring blade 26A has been shortened so that the effective hinge point is close to the stack 15. The bimetallic blade 23A has been lengthened. Accordingly, the point of attachment of the blades 23A and 26A by welding or riveting is closer to the stack 15 than in the embodiment of FIGS. 1–3. This permits more force to be developed by the bimetallic blade 23A to actuate larger contacts with larger current carrying capacity.

The bimetallic blade 23A of FIG. 7 carries an insulator pin 75 held in place by a spring nut 76. This passes through the aperture 35 in the second contact blade 22A to actuate the first contact 31.

Figure 8:
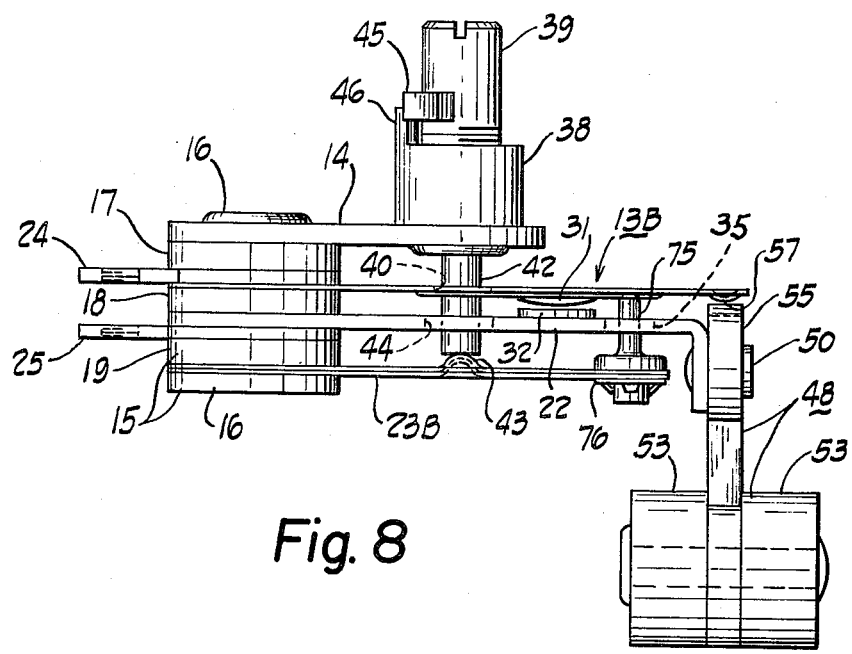
FIG. 8 is an elevational view similar to FIG. 2 of a modified form of thermostatic switch.

FIG. 8 shows another modification similar to FIGS. 1 and 2 and shows a thermostatic switch 13B which has many parts similar to those in FIGS. 1–3 and these parts have been given the same reference numerals. The switch 13B of FIG. 8 has a modified temperature responsive means shown as a bimetallic blade 23B. This is a full length blade mounted in the stack 15 and the outer end of the blade 23B carries an insulator pin 75 which extends through the aperture 35 in the second contact blade 22. This shows an alternative to FIGS. 1, 2, and 3 in the manner in which the movement of the bimetallic blade 23B may be imparted to the first contact 31.

The positive-off adjustment for FIGS. 7 and 8 may be attained by physically bending to deform either the bimetallic blades 23A or 23B or in FIG. 7 bending to deform the spring blade 26A.

FIG. 10 shows another embodiment of the invention of a thermostatic switch 13C which is similar to the construction shown in FIG. 8 and like parts have been designated by the same reference numerals. In FIG. 10 the thermostatic switch 13C has been simplified to omit the attitude responsive means so that the switch 13C is responsive only to the adjustment by the adjusting screw 39 and the movement of the bimetallic blade 23B. This blade is shown in FIG. 9 before assembly in the stack, and is shown with a bend therein at 78 for an initial bias.

FIG. 11 shows the action of this bimetallic blade 23B when assembled into the stack. This bimetallic blade 23B has an action similar to a compound bimetal; namely, one wherein two bimetallic blades are fastened together end to end but with the high expansion sides reversed. When heated, such a compound bimetallic blade assumes a kind of an S-shape. The dotted line position of FIG. 11 shows the bimetallic blade 23B in the heated condition showing that the outer end moves upwardly yet the hinge area near the bend 78 actually deflects downwardly.

FIG. 12 shows a graph 66 of time versus temperature of a typical prior art construction (eg., U.S. Pat. No. 3,201,548.) Such typical prior art construction had two spring contact blades plus a full-length bimetal blade. The first spring contact blade was biased downwardly by its mounting in the stack so that its contact could engage the second contact. The second contact blade was biased upwardly by its mounting in the stack to make sure that it always bore against the adjusting screw. This meant that the two blades changed their attitude relative to the base for different adjustment positions of the adjusting screw. It also meant that at high temperature positions the second contact blade was adjusted into a highly deflected position whereat it exerted considerable force against the first contact blade which in turn resisted this force. Accordingly, for the bimetallic blade to open the contacts, considerable force was required. This is why a full-length bimetallic blade was needed in order to develop enough force to open the contacts at all adjusted operating temperatures.

Now, according to this invention, with the blade 22 being rigid, the bimetallic blade may be made about 50 percent thinner than in conventional thermostatic switches of this type.

Curve 67 of FIG. 12 is an actual time versus temperature curve taken of a thermostatic switch of the type 13B or 13C, shown in FIGS. 8–11, and constructed in accordance with the present invention. This curve 67 shows a considerably smaller temperature differential between the contact closing points 68 and the contact opening points 69 on this curve 67. Further, another deviced advantage of the present invention is the elimination of an overshoot in the initial increase to the operating temperature. The curve 66 of the prior art shows a typical large overshoot 70 which is caused by the extra thickness of the bimetal. Applicant's construction with the center adjusted thin bimetal 23B establishes an initial contact opening point 71 which is a highly desirable undershoot rather than an overshoot. This curve 67 is a test result in an air pot that is typical of the actual conditions used with a room heater, a hair dryer, or the like.

All of the embodiments of the thermostatic switch 13, 13A, 13B, and 13C have several improvements over the typical prior art switches:

1. The switches have one rigid and one resilient contact blade instead of two resilient blades. This feature of the invention provides many advantages:
   a. The same loading of the bimetal in all temperature operating positions.
   b. The same contact pressure at the operating point in all temperature operating positions.
   c. The same temperature differential in all temperature operating positions because of constant contact pressures.
   d. The same contact gap in the tilted position at all temperature settings.
   e. The pendulum 49 remains perpendicular to the resilient contact blade 21 in all temperature settings.
   f. The pendulum cam 55 operates against the same constant force in all temperature settings.
   g. In manufacture of successive devices there is a reduction of the number of rejects due to failure to meet calibration specifications because both blades remain parallel in all temperature settings.
2. There is a substantial reduction in the amount of costly bimetal required. The bimetal blade 23 is approximately 50 percent thinner and in FIGS. 1–5, is approximately 50 percent shorter than in the conventional thermostat of this type.
3. The shorter and thinner bimetal of FIGS. 1–7 and the unitary bimetal of FIGS. 8–11 reduce or tend to reduce the first cycle overshoot during initial heating of the appliance 60. This is accomplished by the thinner and lower mass of bimetal.
4. The thinner and lower mass bimetal tends to reduce the temperature differential.
5. During manufacturing of successive thermostatic switches, the design according to the present invention reduces rejects due to failure to meet temperature calibration standards resulting from the positive-off calibration. The typical manufacturing procedure is to establish the temperature calibration, then adjust for the positive-off (eg: adjusting the screw 29) and then again checking the temperature calibration. The prior art construction often deformed a part sufficiently during the positive-off calibration that this made the temperature calibration outside the limits of the temperature calibration. These limits may be plus or minus 10°, or possibly plus or minus 15°. With a thermostatic switch having a large temperature range this way often the cause of temperature calibration rejections after the positive-off calibration.
6. There is a substantial reduction in positive-off rejects because in most cases no positive-off adjustment is required in that the set screw 29 will not be required. The reason for this is that the rigid contact blade 22 is straight and the first contact blade may also be made straight for easy assembly in the stack 15.
7. The temperature calibration of the unitary bimetal 23B of FIGS. 8–11 near its longitudinal center tends to reduce the temperature differential and first cycle overshoot due to its being thinner and with a lower mass than conventional thermostatic switches of this type. These various bimetallic blade constructions 23, 23A, 23B as shown in FIGS. 2, 7, and 8 may be used as alternatives in any of the various thermostatic switches 13, 13A, 13B, and 13C.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thermostatic switch comprising, in combination, a rigid base,
   a stack mounted on said base,
   a resilient first contact blade mounted in said stack,
   a substantially rigid second contact blade mounted in said stack,
   first and second contacts on said first and second blades, respectively, and positioned for mutual cooperation,
   temperature responsive means supported relative to said stack and acting on said first contact blade to actuate said first contact blade with tempeature changes,
   said temperature responsive means being a composite of a spring blade and a bimetallic blade connected in series and with said spring blade being fastened in said stack,
   and adjusting means acting between said base and said temperature responsive means for adjustment of the operating temperature of said contacts.

2. A thermostatic switch as set forth in claim 1, wherein said temperature responsive means is a bimetallic blade having a length less than that of said first contact blade.

3. A thermostatic switch as set forth in claim 2, wherein said bimetallic blade has a length less than the distance from said stack to the center of said first contact.

4. A thermostatic switch as claimed in claim 1, wherein said temperature responsive means is a bimetallic blade.

5. A thermostatic switch as claimed in claim 4, including means cooperating between a movable end of said bimetallic blade and acting on said first contact blade through an aperture in said second contact blade.

6. A thermostatic switch as claimed in claim 1, wherein said adjusting means is an adjusting screw.

7. A thermostatic switch as claimed in claim 6, wherein said adjusting screw acts through apertures in said first and second contact blades.

8. A thermostatic switch as claimed in claim 1, including means including said stack electrically insulating said first and second contact blades except when said contacts are in engagement.

9. A thermostatic switch as claimed in claim 1, including an extension on said spring blade extending beyond the connection point of said bimetallic blade and said spring blade,
   and an abutment acting between said bimetallic blade and said spring blade extension to act as a positive off means for said contacts.

10. A thermostatic switch comprising, in combination,
    a rigid base,
    a stack mounted on said base,
    a resilient first contact blade mounted in said stack, a substantially rigid second contact blade mounted in said stack, first and second contacts on said first and second blades, respectively, and positioned for mutual cooperation, temperature responsive means supported relative to said stack and acting on said first contact blade to actuate said first contact blade with temperature changes, an adjusting screw acting between said base and said temperature responsive means for adjustment of the operating temperature of said contacts, said temperature responsive means being a bimetallic blade having one end thereof fixed in said stack, a free end of said bimetallic blade acting on said first contact blade, and said adjusting screw acting on a mid-portion of said bimetallic blade.

11. A slow make and break thermostatic switch comprising, in combination, a rigid base, a stack mounted on said base, a creep action resilient first contact blade mounted in said stack, a substantially rigid second contact blade mounted in said stack, first and second contacts on said first and second blades, respectively, and positioned for mutual cooperation, temperature responsive means, means supporting said temperature responsive means from said stack and acting on said first contact blade to actuate said first contact blade with temperature changes, adjusting means connected for adjustment of the operating temperature of said contacts, and attitude responsive means mounted responsive to the attitude of said rigid second contact blade to actuate said contacts in at least one attitude of said second contact blade.

12. A thermostatic switch as claimed in claim 11, wherein said attitude responsive means is mounted for movement relative to said second contact blade.

13. A thermostatic switch as claimed in claim 11, wherein said attitude responsive means is a pendulum swingably mounted on said rigid second contact blade, a cam movable in accordance with said pendulum, and a cam follower on the outboard end of said first contact blade cooperable with said cam.

14. A thermostatic switch as claimed in claim 11, wherein said attitude responsive means is a pendulum swingably mounted on said rigid second contact blade, a cam movable directly with said pendulum, a cam follower on the outboard end of said first contact blade, said cam having a cam null cooperating with said cam follower to establish said contacts in engagement with the pendulum hanging in a first position and with said adjustment means at one limit condition, said thermostatic switch being mountable in an electrical device subject to being tipped over whereat said pendulum may swing and have said cam actuate said cam follower to positively separate said contacts despite all adjustment positions of said adjusting means.

15. A thermostatic switch as set forth in claim 11, wherein said temperature responsive means is a composite of a spring blade and a bimetallic blade connected in series and with said spring blade being mounted in said stack.

16. A thermostatic switch as claimed in claim 11, wherein said temperature responsive means is a bimetallic blade.

17. A thermostatic switch as claimed in claim 16, including means cooperating between a movable end of said bimetallic blade and acting on said first contact blade through an aperture in said second contact blade.

18. A thermostatic switch as claimed in claim 11, wherein said adjusting means is an adjusting screw acting through apertures in said first and second contact blades.

19. A thermostatic switch as claimed in claim 28, wherein said temperature responsive means is a bimetallic blade having one end thereof mounted on said base, a free end of said bimetallic blade acting on said first contact blade, and said adjusting screw acting on a mid-portion of said bimetallic blade.

20. A thermostatic switch as claimed in claim 11, including a stack mounted on said base, and means including said stack electrically insulating said first and second contact blades except when said contacts are in engagement.

* * * * *

UNITED STATES PATENT OFFICE
CERTIFICATE OF CORRECTION

Patent No. 3,913,048　　　　　　　　　　Dated October 14, 1975

Inventor(s) Charles S. Mertler

It is certified that error appears in the above-identified patent and that said Letters Patent are hereby corrected as shown below:

Column 10, Line 34, "Claim 28" should be --Claim 18--.

Signed and Sealed this tenth Day of February 1976

[SEAL]

Attest:

RUTH C. MASON  
*Attesting Officer*

C. MARSHALL DANN  
*Commissioner of Patents and Trademarks*